US012809896B2

(12) United States Patent
Yovanovich

(10) Patent No.: US 12,809,896 B2
(45) Date of Patent: Nov. 24, 2026

(54) REPORT ARCHIVAL AND RETRIEVAL SYSTEM

(71) Applicant: Capital One Services, LLC, McLean, VA (US)

(72) Inventor: Jay Daniel Yovanovich, Raleigh, NC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/049,372

(22) Filed: Feb. 10, 2025

(65) Prior Publication Data

US 2025/0181618 A1 Jun. 5, 2025

Related U.S. Application Data

(63) Continuation of application No. 18/357,363, filed on Jul. 24, 2023, now Pat. No. 12,222,971.

(51) Int. Cl.

| | |
|---|---|
| ***G06F 7/00*** | (2006.01) |
| ***G06F 16/334*** | (2025.01) |
| ***G06F 16/38*** | (2019.01) |
| ***G06F 21/60*** | (2013.01) |

(52) U.S. Cl.
CPC ............ *G06F 16/334* (2019.01); *G06F 16/38* (2019.01); *G06F 21/602* (2013.01)

(58) Field of Classification Search
CPC ....... G06F 16/334; G06F 16/38; G06F 21/602
USPC .................................................. 707/600–899
See application file for complete search history.

(56) References Cited

U.S. PATENT DOCUMENTS

| | | | | |
|---|---|---|---|---|
| 9,529,851 | B1 | 12/2016 | Smith | |
| 2021/0042314 | A1 * | 2/2021 | Battle | G06F 16/22 |
| 2025/0036669 | A1 | 1/2025 | Yovanovich | |

* cited by examiner

*Primary Examiner* — Isaac M Woo
(74) *Attorney, Agent, or Firm* — Harrity & Harrity, LLP

(57) ABSTRACT

In some implementations, a device may receive report data associated with one or more reports generated by a source mainframe, wherein the report data is in a plain text data format. The device may convert the report data from the plain text data format to a platform-independent data format associated with metadata defining one or more attributes for the report data. The device may receive, from a client device, a query that includes one or more search parameters matching the one or more attributes for the report data. The device may provide the report data associated with the one or more attributes matching the one or more search parameters to the client device.

20 Claims, 4 Drawing Sheets

REPORT ARCHIVAL AND RETRIEVAL SYSTEM

RELATED APPLICATION

This application is a continuation of U.S. patent application Ser. No. 18/357,363, filed Jul. 24, 2023 (now U.S. Pat. No. 12,222,971), which is incorporated herein by reference in its entirety.

BACKGROUND

Cloud migration refers to processes to transfer digital assets, applications, data, and/or information technology infrastructure from an on-premises system or traditional hosting environment to a cloud computing environment. Migration to the cloud typically involves processes to adopt cloud computing services, such as infrastructure as a service (IaaS), platform as a service (PaaS), or software as a service (SaaS), provided by a cloud service provider. Cloud migration is often employed with a goal to leverage the benefits of cloud computing, including scalability, flexibility, cost-efficiency, and/or enhanced security, among other examples.

SUMMARY

Some implementations described herein relate to a system for report archival and retrieval. The system may include one or more memories and one or more processors communicatively coupled to the one or more memories. The one or more processors may be configured to obtain, from a source mainframe, report data associated with one or more reports, wherein the report data is in a native data format when the report data is obtained from the source mainframe. The one or more processors may be configured to convert the report data associated with the one or more reports from the native data format to a plain text data format. The one or more processors may be configured to transmit the report data associated with the one or more reports from the source mainframe to a cloud computing environment, wherein the report data transmitted from the source mainframe to the cloud computing environment is in the plain text data format. The one or more processors may be configured to convert, by a serverless compute service running in the cloud computing environment, the report data from the plain text data format to a platform-independent data format associated with metadata defining one or more attributes for the report data. The one or more processors may be configured to receive, from a client device, a query that includes one or more search parameters matching the one or more attributes for the report data. The one or more processors may be configured to provide the report data associated with the one or more attributes matching the one or more search parameters to the client device.

Some implementations described herein relate to a method for report archival and retrieval. The method may include receiving, by a device in a cloud computing environment, report data associated with one or more reports generated by a source mainframe, wherein the report data is in a plain text data format. The method may include converting, by the device, the report data from the plain text data format to a platform-independent data format associated with metadata defining one or more attributes for the report data. The method may include receiving, from a client device, a query that includes one or more search parameters matching the one or more attributes for the report data. The method may include providing, by the device, the report data associated with the one or more attributes matching the one or more search parameters to the client device.

Some implementations described herein relate to a non-transitory computer-readable medium that stores a set of instructions. The set of instructions, when executed by one or more processors of a system, may cause the system to obtain, from a source mainframe, report data associated with one or more reports, wherein the report data is in a native data format when the report data is obtained from the source mainframe. The set of instructions, when executed by one or more processors of the system, may cause the system to convert the report data associated with the one or more reports from the native data format to a plain text data format. The set of instructions, when executed by one or more processors of the system, may cause the system to transmit the report data associated with the one or more reports from the source mainframe to a cloud computing environment, wherein the report data transmitted from the source mainframe to the cloud computing environment is in the plain text data format. The set of instructions, when executed by one or more processors of the system, may cause the system to convert the report data from the plain text data format to a platform-independent data format associated with metadata defining one or more attributes for the report data. The set of instructions, when executed by one or more processors of the system, may cause the system to store the report data in the platform-independent data format and the metadata defining the one or more attributes for the report data within the cloud computing environment.

DETAILED DESCRIPTION

Figure 1:
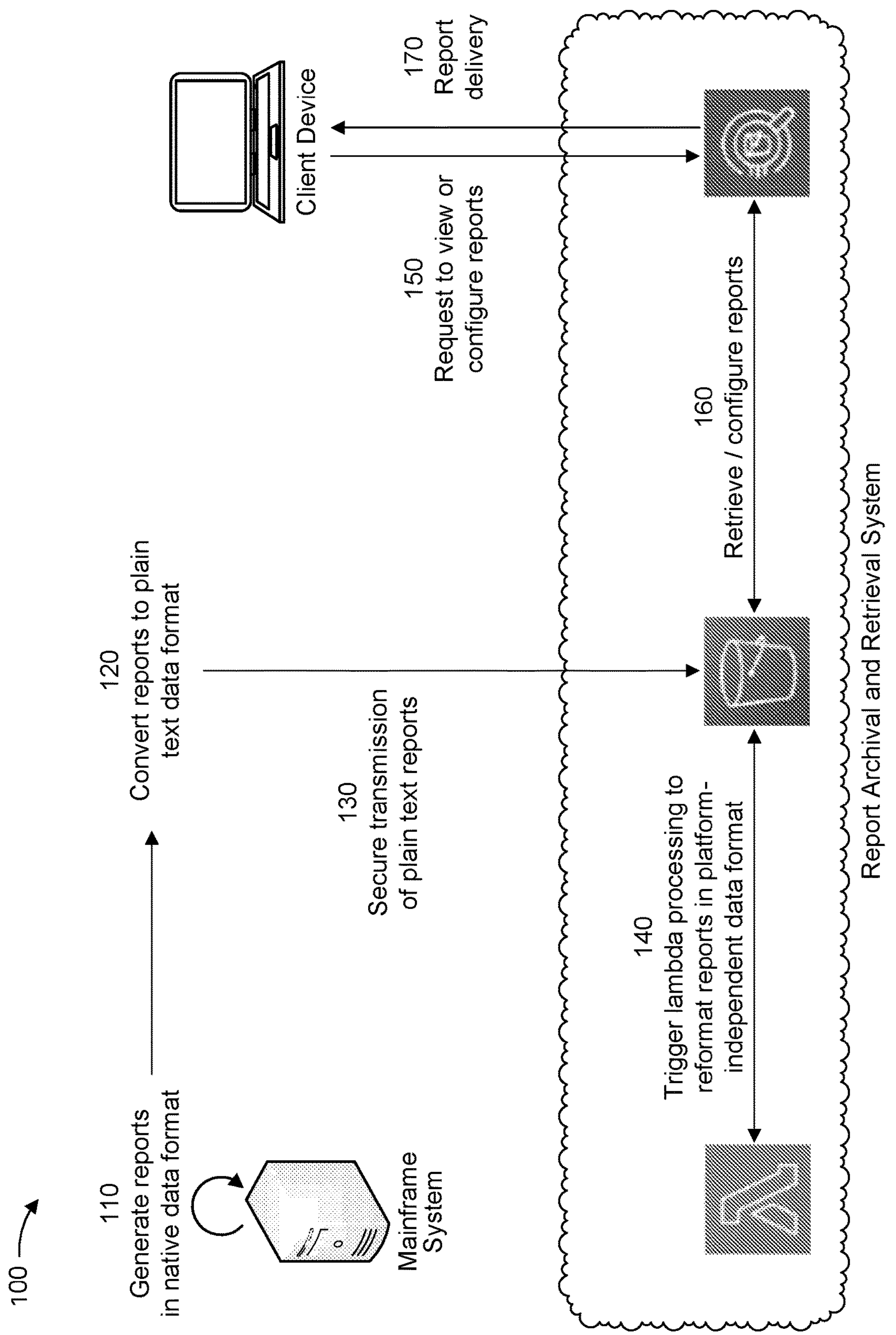
FIG. 1 is a diagram of an example implementation associated with report archival and retrieval, in accordance with some embodiments of the present disclosure.

The following detailed description of example implementations refers to the accompanying drawings. The same reference numbers in different drawings may identify the same or similar elements.

Mainframe systems are computers that are primarily used by large organizations for critical applications, bulk data processing, enterprise resource planning, and/or transaction processing, among other examples. Many organizations are phasing out mainframe systems and replacing mainframe systems with more modern computing infrastructure, such as distributed devices and/or cloud computing platforms. For example, many organizations have developed applications or systems that are built on old technology platforms (e.g., mainframe systems), which results in large and monolithic applications or systems. However, making changes to such applications or systems to meet new business needs is difficult and risky. For example, mainframe systems typically utilize a first code type (e.g., a common business-oriented language (COBOL) code type) that may generate data in a native data format (e.g., extended binary-coded decimal interchange code (EBCDIC)) that may need to be converted to a platform-independent data format (e.g., a Java data format, such as JavaScript object notation (JSON)) to achieve increased efficiency and/or other advantages of the cloud computing environment.

However, converting an entire dataset from the native data format to the platform-independent data format to enable migration from a source mainframe system to a cloud computing environment poses various challenges. For example, although cloud migration offers benefits such as scalability, cost-efficiency, and increased flexibility, cloud migration also presents challenges related to application compatibility, in that some applications may not be designed to run seamlessly in a cloud computing environment. Legacy applications or applications that are built for specific on-premises systems (e.g., mainframe systems) may need to be modified or rearchitected to function optimally in the cloud. Compatibility issues can also arise due to dependencies on specific hardware, operating systems, or underlying infrastructure. Furthermore, another challenge that arises when migrating data from a mainframe system to a cloud computing environment relates to data transfer and integration, as transferring large data volumes to the cloud computing environment can be time-consuming and bandwidth-intensive. Organizations typically have to plan efficient data migration strategies, including selecting the right data transfer techniques and/or addressing data compatibility issues between on-premises systems and cloud computing environments. Furthermore, cloud migration presents issues with respect to security and compliance, as migrating sensitive data and critical workloads to cloud computing environments raises concerns about data security and compliance with applicable regulations. Organizations need to ensure that appropriate security measures are implemented, including data encryption, access controls, and robust identity management.

Some implementations described herein relate to a report archival and retrieval system that may be used to migrate report data from a source mainframe system to a cloud computing environment where the report data can then be accessed and viewed by individual users. For example, in some implementations, the source mainframe system may be configured to execute one or more programs (e.g., COBOL programs) that generate reports in a native data format, such as EBCDIC, which are then sent to a system archival and retrieval (SAR) application that resides on the mainframe system. In some implementations, the SAR application may then convert the report data from the native data format to a plain text format, such as American standard code for information interchange (ASCII), and the report data may then be compressed and sent to a cloud computing environment using a secure transmission protocol (e.g., a transport layer security (TLS) cryptographic protocol). The report data may be stored using a storage resource within the cloud computing environment, and a notification service associated with the cloud computing environment may trigger a serverless compute service to process the report data. For example, in some implementations, the serverless compute service may obtain the report data from the storage resource, reformat the report data in accordance with a platform-independent format, such as JSON, and return the reformatted report data to the storage resource to be consumed via a user interface service. For example, a user may submit, via a client device, a query that indicates one or more search parameters for a report or report data to be viewed, and an interactive query service running In the cloud computing environment may analyze the report data stored in the storage resource to identify one or more reports or report data matching the search parameters provided in the search query received from the client device. Accordingly, in some implementations, the one or more reports or report data matching the search parameters provided in the search query may then be returned to the client device to be viewed via a suitable user interface. Furthermore, in some implementations, the report data that is stored by the storage service may be masked to protect privacy or security for one or more sensitive data fields, and the sensitive data fields may be masked or unmasked when viewed via the user interface depending on the access rights associated with the requesting user.

In this way, some implementations described herein provide an end-to-end architecture for migrating report data from a source mainframe system to a cloud computing environment where the report data can be archived and retrieved by individual users. Furthermore, some implementations described herein may address the challenges that organizations face when attempting to migrate report data that contain sensitive information from mainframe systems to cloud computing environments.

FIG. 1 is a diagram of an example 100 associated with report archival and retrieval. As shown in FIG. 1, example 100 includes a mainframe system, a report archival and retrieval system, and a client device. The mainframe system, the report archival and retrieval system, and the client device are described in more detail in connection with FIG. 2 and FIG. 3.

As shown in FIG. 1, and by reference number 110, the mainframe system may generate a set of reports in a native data format. For example, in some implementations, the set of reports may be generated at periodic intervals (e.g., daily, weekly, monthly, annually, and/or at other suitable intervals), and each report that is generated by the mainframe system may include information that relates to performance, operations, key metrics, and/or other suitable aspects related to activities that occur within or are relevant to an organization. For example, the reports may include financial data (e.g., related to revenue, expenses, profits, cash flow, and/or balance sheets), sales data (e.g., related to product sales, revenue figures, and/or customer orders), inventory data (e.g., related to stock levels, item descriptions, and/or storage locations), and/or customer data (e.g., related to names, addresses, contact details, and/or purchase histories). Accordingly, as described herein, the reports that are generated by the mainframe system may generally present key performance indicators (KPIs) and other measurable data relevant to the goals and/or objectives of an organization, which may assist various users (e.g., executives, managers, decision-makers, and/or stakeholders) in making informed choices to drive growth, improve efficiency, address challenges, and/or otherwise manage organizational operations.

In some implementations, as described herein, the reports that are generated by the mainframe system may be generated in a native data format, such as EBCDIC, which is a character encoding scheme compatible with the mainframe system. For example, the reports generated in the native data format by one or more COBOL programs or other suitable applications running on the mainframe system, and the reports that are generated in the native data format may be structured and encoded for compatibility with the mainframe system. However, the EBCDIC data format generally lacks native support by cloud computing platforms, which typically rely on encoding in a plain text data format, such as ASCII. Furthermore, the report data generated by the source mainframe system includes various data fields that are represented internally with a character set that differs from a character set that is compatible with cloud computing platforms. Accordingly, in some implementations, to migrate the report data that is generated by the mainframe system from the mainframe system to the cloud computing environment, the report data may be converted to a plain text data format and otherwise prepared to ensure compatibility and seamless integration with the cloud computing environment.

Accordingly, as shown in FIG. 1, and by reference number 120, the report data that is generated by the mainframe system may be converted from the native data format associated with the mainframe system to a plain text data format that is compatible with a cloud computing infrastructure. For example, in some implementations, the mainframe system may send the reports that are generated by the mainframe system to an SAR application that resides on the mainframe system (e.g., daily, weekly, or at other suitable intervals), and the SAR application may execute one or more jobs that are configured to pull the report data from the SAR application and pre-process the report data to be sent to the report archival and retrieval system that is hosted in a cloud computing environment. For example, in some implementations, the SAR application may be configured to convert the report data from the EBCDIC data format that is incompatible with the cloud computing environment to the ASCII data format that can be ingested and processed in the cloud computing environment (e.g., converting EBCDIC characters to ASCII characters). Furthermore, in some implementations, the SAR application residing on the mainframe system may identify one or more data fields included in the report data that contain sensitive information, such as personally identifiable information (PII) (e.g., names, addresses, or the like) and/or highly sensitive human data (HSHD) (e.g., bank account numbers, social security numbers, or the like), and such data fields may be masked to prevent exposure to unauthorized users or malicious actors after the report data has been migrated to the cloud computing environment. For example, the data fields that contain sensitive information may be masked and encrypted to obscure a portion of the characters within the data field (e.g., all but the last four digits of a credit card number or social security number). In this way, if an unauthorized user or malicious actor were to attempt to view the data fields that contain sensitive information after the report data has been migrated to the cloud computing environment, the sensitive information would not be readable.

As shown in FIG. 1, and by reference number 130, the SAR application running on the source mainframe system may send the report data in the plain text format to the report archival and retrieval system that resides in the cloud computing environment. For example, in some implementations, the SAR application running on the source mainframe system may send the report data to the report archival and retrieval system using a secure transmission protocol (e.g., a Connect: Direct or Network Data Mover (NDM) protocol) that supports transferring data between the source mainframe system and the report archival and retrieval system that resides in the cloud computing environment. In some implementations, the secure transmission protocol may be used to encrypt the payloads that are sent to the report archival and retrieval system (e.g., using TLS, a secure socket layer (SSL), and/or a station-to-station protocol (STS)). Furthermore, in some implementations, the SAR application running on the source mainframe system may compress the report data prior to sending the report data to the report archival and retrieval system (e.g., to enable faster transmission). As shown in FIG. 1, the report data may be received by the report archival and retrieval system, which may execute a simple storage service (S3) that provides object-based storage for the report data. For example, the report data may be stored in an S3 bucket as distinct object units, where each object includes report content or report data associated with a report, a unique identifier for the object, and descriptive metadata associated with the object (e.g., the name of the object, a Uniform Resource Locator (URL) or other network address associated with the object, and/or a size of the object).

As further shown in FIG. 1, and by reference number 140, the report archival and retrieval system may trigger a lambda function to reformat the report data in accordance with a platform-independent data format. For example, as described herein, the lambda function may include a serverless compute function that can run code when one or more configured events occur and automatically manage computing resources that the code requires (e.g., allocating processor, memory, storage, and/or other computing resources to the code run by the lambda function when the one or more configured events have occurred). For example, the lambda function may correspond to a container instance (e.g., an isolated user space instance) associated with a random access memory (RAM) allocation, an ephemeral storage allocation, and a configurable execution time (e.g., from 1 to 900 seconds), where the ephemeral storage remains locally available only for a duration of the lambda function and is discarded after all tasks running on the lambda function have completed. Furthermore, as described herein, the lambda function is generally triggered when one or more events occur (e.g., rather than being started or controlled directly). Each execution of the lambda function is run in a new environment (e.g., a new container) such that access to an execution context from previous and/or subsequent runs of the lambda function are not accessible during a current run, which makes each instance of the lambda function stateless with all incoming and outgoing data being stored using resources external to the lambda function. For example, in some implementations, the report archival and retrieval system may execute a simple notification service (SNS) that may trigger the lambda function when one or more reports or report data is delivered to the S3 bucket. For example, when a report is sent from the SAR application running on the mainframe system to the report archival and retrieval system, the report may be stored in the S3 bucket in a staging folder, and the SNS may trigger the lambda function each time that a report is stored in the staging folder.

Accordingly, when the lambda function is triggered (e.g., by the SNS when one or more reports or report data is delivered to the staging folder of the S3 bucket), the lambda function may obtain the report data from the S3 bucket and reformat the report data in accordance with the platform-independent data format. For example, the lambda function may receive raw report data from the staging folder of the S3 bucket (e.g., in the plain text ASCII data format), and may convert raw print lines in each report to create record in a dataset delivery table associated with a platform-independent data format, such as a JSON data format, which is then sent to a delivery folder associated with the S3 bucket (e.g., to enable subsequent delivery to a client device, as described in more detail elsewhere herein). Furthermore, for each report that is processed by the lambda function, the lambda function may create a record in a dataset action table associated with the platform-independent data format, which may be sent to an action table associated with the S3 bucket (e.g., to enable subsequent logging of actions that are performed by the report archival and retrieval system, as described in more detail elsewhere herein).

For example, when the lambda function is triggered based on one or more reports or report data being delivered to the staging folder of the S3 bucket, the lambda function may generally parse the plain text (e.g., ASCII) data associated with the reports into JSON records and may also add descriptive metadata to each JSON record and/or mask (e.g., apply a mask to) any sensitive data fields or sensitive data types that are found within the JSON record. For example, a JSON record that the lambda function creates and adds to a dataset delivery table may generally include a set of attributes associated with each report, where the set of attributes may include a report identifier, a creation date, a creation time, a source system identifier, a source process identifier, a report status, a date of a last update, a name, a description, a producer, one or more access roles, and/or a number of retention days, among other examples. Furthermore, the record that is created in the dataset action table may include attributes such as a12ctionon type (e.g., staging or delivery), an action result (e.g., success or failure), an action date, and/or an action time. In some implementations, after the lambda function has appropriately processed the report data to reformat the report data in accordance with the platform-independent (e.g., JSON) data format, the lambda function may return the corresponding records to the S3 bucket. In some implementations, the report data that is stored within the S3 bucket may be encrypted in compliance with one or more information security policies (e.g., International Organization for Standardization (ISO) 27001), which may provide that files and objects containing protected field data be encrypted using default infrastructure encryption (e.g., transport encryption for data-in-transit, and file system and/or storage level encryption for data-at-rest) and with file-level or object-level function specific keys. In some implementations, when the report data is stored in the delivery folder of the S3 bucket, the report data may then be searchable and suitable for consumption via one or more user interface services.

As further shown in FIG. 1, and by reference number 150, the report archival and retrieval system may receive, from a client device, a request to retrieve or configure one or more reports. For example, in some implementations, the request that is received from the client device may include a request to onboard one or more reports from the source mainframe system onto the report archival and retrieval system that is hosted in the cloud computing environment. For example, for each report that is to be onboarded onto the report archival and retrieval system, the request may indicate an identifier, a name, a description, a producer, a type, and/or a retention period (e.g., a number of days) for the corresponding report. In general, one onboarding request may contain parameters for one or more reports to be onboarded and/or may include a batch mode request for indicating a large quantity of reports. In some implementations, the report archival and retrieval system may then communicate with the SAR application residing in the mainframe system to onboard the requested reports (e.g., configuring functions to obtain the report data, convert the report data from EBCDIC to ASCII, transfer the report data to the report archival and retrieval system, and reformat the report data into searchable JSON records). In some implementations, the report archival and retrieval system may process each onboarding request in accordance with a service level agreement (SLA), which may specify a time period within which the onboarding request will be completed (e.g., a number of business days).

Additionally, or alternatively, the request that is received from the client device may include a request to onboard one or more consumers, which may define users or individuals that are authorized to access the report data hosted by the report archival and retrieval system. For example, for each consumer that is to be onboarded onto the report archival and retrieval system, the request may indicate an identifier (e.g., an employee identifier), a name, a line of business, an account identifier, and/or a business unit identifier, among other examples, for the corresponding consumer or user. In general, one onboarding request may contain parameters for one or more consumers or users to be onboarded and/or may include a batch mode request for indicating a large quantity of consumers or users. In some implementations, the report archival and retrieval system may then communicate with the SAR application residing in the mainframe system to onboard the requested reports (e.g., configuring functions to obtain the report data, convert the report data from EBCDIC to ASCII, transfer the report data to the report archival and retrieval system, and reformat the report data into searchable JSON records). In some implementations, the report archival and retrieval system may process each onboarding request in accordance with an SLA, which may specify a time period within which the onboarding request will be completed (e.g., a number of business days).

Additionally, or alternatively, in some implementations, the request that is received from the client device may include a request to retrieve and view one or more reports. For example, in some implementations, the report archival and retrieval system may include a user interface service with American National Standards Institute (ANSI) structured query language (SQL) support, and may be compatible with various standard data formats (e.g., JSON, comma separated variables (CSV), Optimized Row Columnar (ORC), Avro, and/or Parquet).

Accordingly, as further shown in FIG. 1, and by reference number 160, the report archival and retrieval system may retrieve and/or configure one or more reports based on one or more search parameters that are provided in the query received from the client device. For example, in some implementations, the report archival and retrieval system may identify one or more reports or report data that matches the one or more search parameters, and may retrieve or configure the one or more reports or report data that matches the one or more search parameters. For example, in some implementations, the user interface service may identify the reports or report data that matches the one or more search parameters by performing complex analysis, including large joins, window functions, and arrays, and may execute queries using compute resources across multiple facilities of the cloud computing environment and multiple devices in each facility. Furthermore, in cases where the report archival and retrieval system receives multiple queries from one or more client devices, the user interface service may execute the queries in parallel.

In some implementations, when the user interface service receives a query that includes one or more parameters for a report or report data to be retrieved, the user interface service may trigger a lambda function (e.g., a serverless compute function) to process the query. For example, in some implementations, the lambda function may load a user interface with a dropdown or other suitable user interface element to indicate one or more reports that match the query. Accordingly, the client device may then select one or more reports to be retrieved and viewed, which may trigger the lambda function to analyze access controls associated with the requesting user to determine whether the user is authorized to view the requested report(s). For example, as described herein, each report may be associated with one or more access rights or other parameters associated with users that are authorized to view the report, and the lambda function may read information associated with the requested reports from the S3 bucket to determine whether to allow or deny the request based on the access rights associated with the user. In cases where the user is authorized to view the report, the lambda function may create a record in the action table to capture the activity performed by the user, and may deliver the requested report to the user, as shown by reference number 170. Furthermore, in cases where the report includes one or more masked data fields that contain sensitive data, the masked data fields may be unmasked or exposed in cases where the user access rights indicate that the user is authorized to view the sensitive data, or may remain masked in cases where the user access rights indicate that the user lacks authorization to view the sensitive data.

In addition, as described herein, the report archival and retrieval system may store an audit trail that includes information related to interactions with the report data within the cloud computing environment. For example, the audit trail may include information related to processing that is performed by the lambda function to reformat reports into the platform-independent (e.g., JSON) data format, onboard reports and/or consumers or users, and/or request or retrieve reports. In this way, the audit trail may record events that occur within the report archival and retrieval system, and the audit trail may be made available to enable operational and risk auditing, governance, and access to the report archival and retrieval system.

As indicated above, FIG. 1 is provided as an example. Other examples may differ from what is described with regard to FIG. 1.

Figure 2:
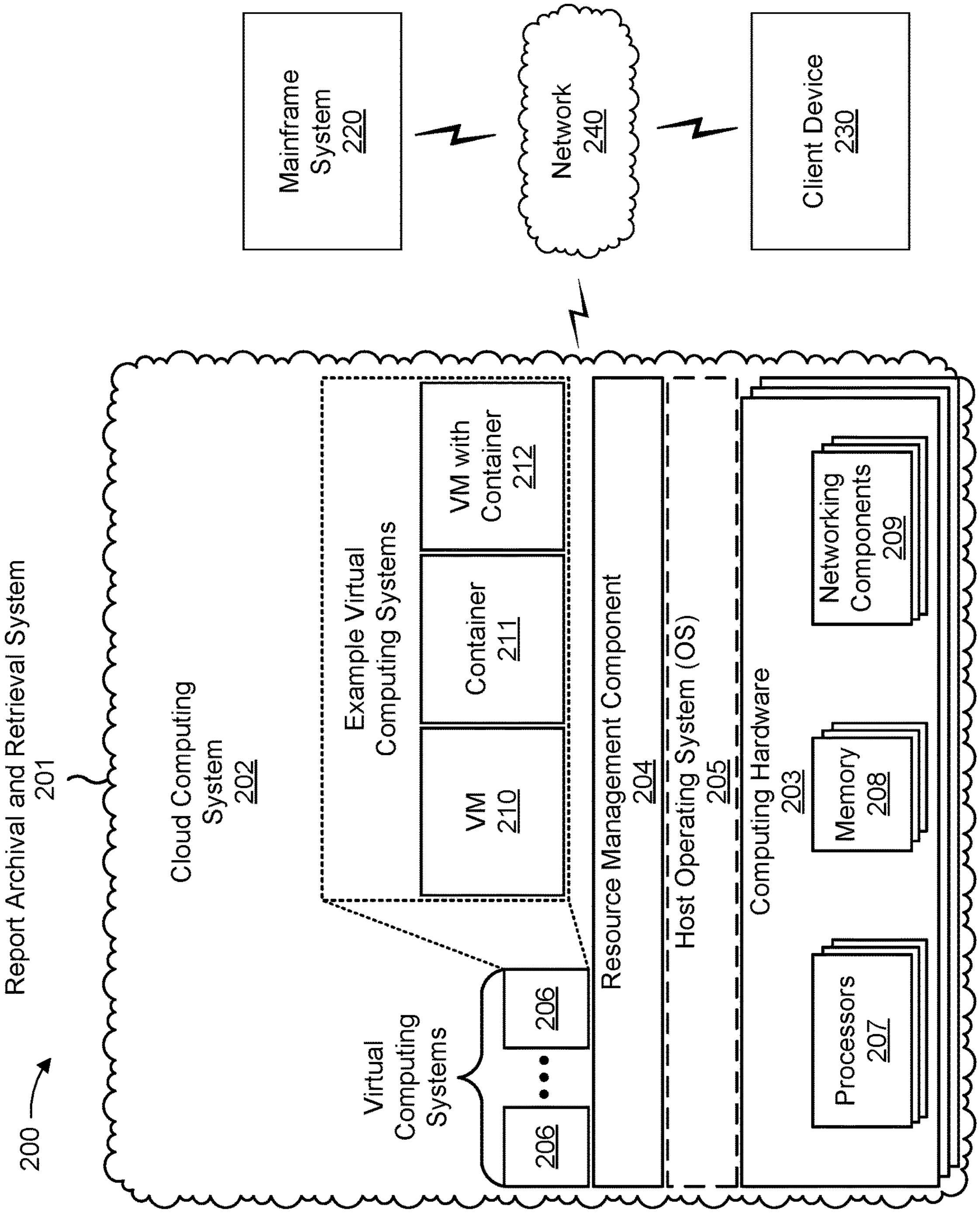
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a report archival and retrieval system 201, which may include one or more elements of and/or may execute within a cloud computing system 202. The cloud computing system 202 may include one or more elements 203-212, as described in more detail below. As further shown in FIG. 2, environment 200 may include a mainframe system 220, a client device 230, and a network 240. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the report archival and retrieval 201 may include one or more elements 203-212 of the cloud computing system 202, may execute within the cloud computing system 202, and/or may be hosted within the cloud computing system 202, in some implementations, the report archival and retrieval 201 may not be cloud-based (e.g., may be implemented outside of a cloud computing system) or may be partially cloud-based. For example, the report archival and retrieval 201 may include one or more devices that are not part of the cloud computing system 202, such as device 300 of FIG. 3, which may include a standalone server or another type of computing device. The report archival and retrieval 201 may perform one or more operations and/or processes described in more detail elsewhere herein.

The mainframe system 220 includes one or more devices capable of receiving, generating, storing, processing, and/or providing information, such as information described herein. For example, the mainframe system 220 may include a mainframe computer, a group of mainframe computers, a device characterized by redundant internal engineering resulting in high reliability and security and extensive input-output facilities with the ability to offload to separate engines, or a similar type of device, which generates reports associated with a native data format (e.g., EBCDIC). In some implementations, the mainframe system 220 may execute one or more applications that are configured to convert report data associated with the native data format generated by the mainframe system 220 to a plain text data format (e.g., ASCII).

The client device 230 may include one or more devices capable of receiving, generating, storing, processing, and/or providing information associated with report archival and retrieval, as described elsewhere herein. The client device 230 may include a communication device and/or a computing device. For example, the client device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 240 may include one or more wired and/or wireless networks. For example, the network 240 may include a cellular network, a public land mobile network (PLMN), a local area network (LAN), a wide area network (WAN), a private network, the Internet, and/or a combination of these or other types of networks. The network 240 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
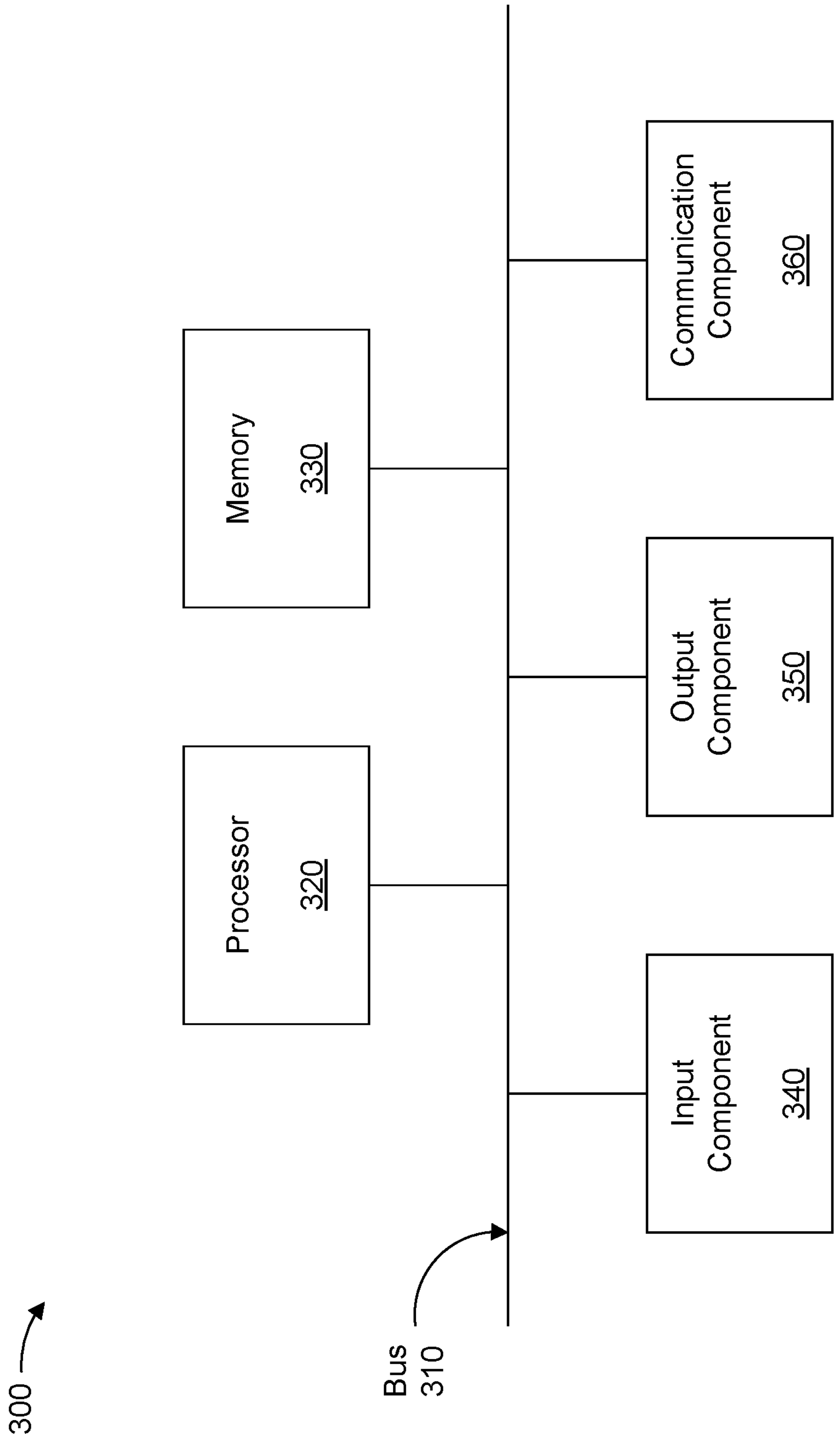
FIG. 3 is a diagram of example components of one or more devices of FIG. 2, in accordance with some embodiments of the present disclosure.

FIG. 3 is a diagram of example components of a device 300 associated with report archival and retrieval system. The device 300 may correspond to the report archival and retrieval system 201, mainframe system 220, and/or client device 230. In some implementations, the report archival and retrieval system 201, mainframe system 220, and/or client device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include RAM, read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
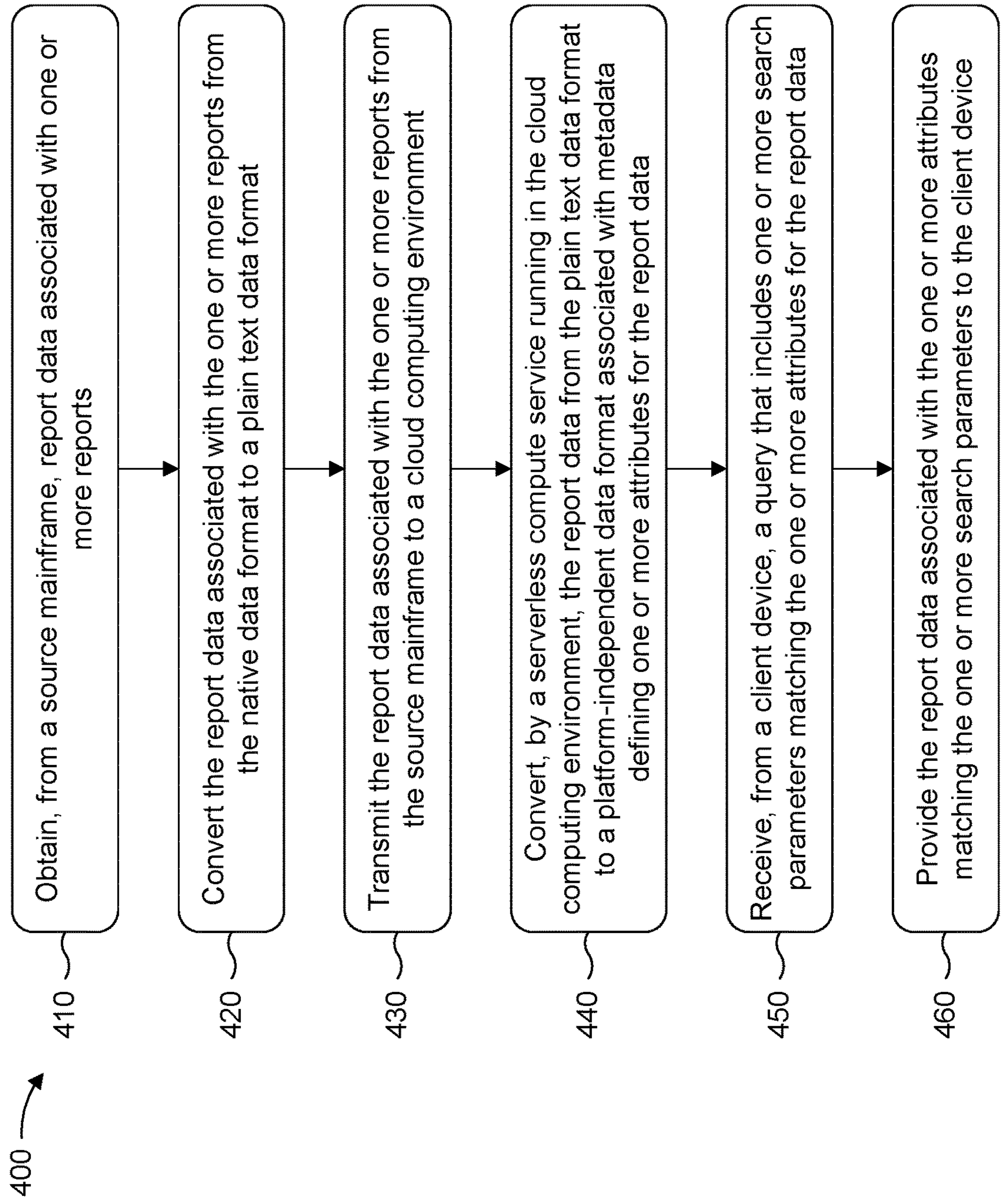
FIG. 4 is a flowchart of an example process associated with report archival and retrieval, in accordance with some embodiments of the present disclosure.

FIG. 4 is a flowchart of an example process 400 associated with report archival and retrieval m. In some implementations, one or more process blocks of FIG. 4 may be performed by the report archival and retrieval system 201. In some implementations, one or more process blocks of FIG. 4 may be performed by another device or a group of devices separate from or including the report archival and retrieval system 201, such as the mainframe system 220 and/or the client device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining, from a source mainframe, report data associated with one or more reports (block 410). For example, the report archival and retrieval system 201 may obtain (e.g., using processor 320 and/or memory 330), from a source mainframe, report data associated with one or more reports, wherein the report data is in a native data format when the report data is obtained from the source mainframe, as described above in connection with reference number 110 of FIG. 1. In some implementations, the report data is in a native data format when the report data is obtained from the source mainframe. As an example, the source mainframe system may execute one or more COBOL programs or other suitable programs or applications that generate reports in a native data format, such as an EBCDIC data format, at periodic intervals (e.g., daily). In some implementations, the reports may be obtained (e.g., by a system archival and retrieval application running on the source mainframe system), which may then process the report data to prepare the report data for migration from the source mainframe system to a cloud computing environment.

As further shown in FIG. 4, process 400 may include converting the report data associated with the one or more reports from the native data format to a plain text data format (block 420). For example, the report archival and retrieval system 201 (e.g., using processor 320 and/or memory 330) may convert the report data associated with the one or more reports from the native data format to a plain text data format, as described above in connection with reference number 120 of FIG. 1. As an example, an application running on the source mainframe system may convert report data from a native data format (e.g., EBCDIC) to a plain text format (e.g., ASCII) to prepare the report data for migration to a cloud computing environment.

As further shown in FIG. 4, process 400 may include transmitting the report data associated with the one or more reports from the source mainframe to a cloud computing environment (block 430). For example, the report archival and retrieval system 201 (e.g., using processor 320, memory 330, and/or communication component 360) may transmit the report data associated with the one or more reports from the source mainframe to a cloud computing environment, as described above in connection with reference number 130 of FIG. 1. In some implementations, the report data transmitted from the source mainframe to the cloud computing environment is in the plain text data format. As an example, after report data has been obtained from the source mainframe system and converted to a plain text data format that is compatible with the cloud computing environment, the plain text report data may be compressed (e.g., to enable faster transmission) and transmitted to the cloud computing environment using a secure transmission protocol, such as TLS.

As further shown in FIG. 4, process 400 may include converting the report data from the plain text data format to a platform-independent data format associated with metadata defining one or more attributes for the report data (block 440). For example, the report archival and retrieval system 201 (e.g., using processor 320 and/or memory 330) may convert the report data from the plain text data format to a platform-independent data format associated with metadata defining one or more attributes for the report data, as described above in connection with reference number 140 of FIG. 1. As an example, a serverless compute service, such as a lambda service, may be triggered to convert the report data from the plain text data format (e.g., ASCII) into a platform-independent data format (e.g., JSON), that can be suitably queried to enable end users to view the report data. Furthermore, in some implementations, the serverless compute service may add metadata to each record associated with the platform-independent data format to improve search and/or retrieval functions and/or may mask one or more sensitive data fields to enhance security and/or protect privacy, as described in more detail elsewhere herein.

As further shown in FIG. 4, process 400 may include receiving, from a client device, a query that includes one or more search parameters matching the one or more attributes for the report data (block 450). For example, the report archival and retrieval system 201 (e.g., using processor 320, memory 330, input component 340, and/or communication component 360) may receive, from a client device, a query that includes one or more search parameters matching the one or more attributes for the report data, as described above in connection with reference number 150 of FIG. 1. As an example, an end user may submit a query (e.g., an SQL query) that indicates one or more search parameters for a report or report data to be retrieved.

As further shown in FIG. 4, process 400 may include providing the report data associated with the one or more attributes matching the one or more search parameters to the client device (block 460). For example, the report archival and retrieval system 201 (e.g., using processor 320 and/or memory 330) may provide the report data associated with the one or more attributes matching the one or more search parameters to the client device, as described above in connection with reference numbers 160 and 170 of FIG. 1. As an example, the report archival and retrieval system may retrieve a report or report data associated with one or more attributes (e.g., a report identifier, report name, report description, report producer, report type, or the like) that match (e.g., are the same as or within a threshold similarity as) one or more search parameters provided in a search query received from a client device, and the report or report data may then be sent or otherwise delivered to the client device for viewing.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIG. 1. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:

one or more memories; and one or more processors, coupled to the one or more memories, configured to:

obtain, from a first device, data in a native data format;

convert the data from the native data format to another format;

transmit the data to a cloud computing environment, in the other format;

convert, using a compute service, the data from the other format to a platform-independent data format associated with metadata defining one or more attributes for the data, wherein the conversion of the data is based on a function that corresponds to a container instance related to an ephemeral storage, and wherein the ephemeral storage is available for a duration of the function and is discarded after the duration of the function;

receive a query that includes one or more search parameters matching the one or more attributes for the data; and provide the data, associated with the one or more attributes, matching the one or more search parameters.

2. The system of claim 1, wherein the compute service is utilized to add the metadata to a record associated with the platform-independent data format to improve search or retrieval function.

3. The system of claim 1, wherein the compute service is utilized to mask one or more data fields.

4. The system of claim 1, wherein the query was received from a second device, and wherein the data is provided to the second device and includes one or more data fields with sensitive data that is unmasked based on access rights.

5. The system of claim 1, wherein the one or more processors are further configured to:

store an audit trail that includes information related to one or more interactions with the data within the cloud computing environment.

6. The system of claim 1, wherein the one or more processors are further configured to:

identify access rights associated with a second device, wherein the query was received from the second device, and wherein the data that is provided to the second device is based on the access rights.

7. The system of claim 1, wherein the compute service is utilized to manage computing resources.

8. A non-transitory computer-readable medium storing a set of instructions, the set of instructions comprising:

one or more instructions that, when executed by one or more processors of a first device, cause the first device to:

obtain, from a second device, data in a native data format;

convert the data from the native data format to another format;

transmit the data to a cloud computing environment, in the other format;

convert, using a compute service, the data from the other format to a platform-independent data format associated with metadata defining one or more attributes for the data, wherein the conversion of the data is based on a function that corresponds to a container instance related to an ephemeral storage, and wherein the ephemeral storage is available for a duration of the function and is discarded after the duration of the function;

receive a query that includes one or more search parameters matching the one or more attributes for the data; and provide the data associated with the one or more attributes matching the one or more search parameters.

9. The non-transitory computer-readable medium of claim 8, wherein the compute service is utilized to add the metadata to a record associated with the platform-independent data format to improve search or retrieval function.

10. The non-transitory computer-readable medium of claim 8, wherein the compute service is utilized to mask one or more data fields.

11. The non-transitory computer-readable medium of claim 8, wherein the query was received from a third device, and wherein the data is provided to the third device and includes one or more data fields with sensitive data that is unmasked based on access right.

12. The non-transitory computer-readable medium of claim 8, wherein the one or more instructions further cause the first device to:

store an audit trail that includes information related to one or more interactions with the data within the cloud computing environment.

13. The non-transitory computer-readable medium of claim 8, wherein the one or more instructions further cause the device to:

identify access rights associated with a third device, wherein the query was received from the second device, and wherein the data is provided to the third device based on the access rights.

14. The non-transitory computer-readable medium of claim 8, wherein the compute service is utilized to manage computing resources.

15. A method, comprising:

obtaining, by a first device, data in a native data format;

converting, by the first device, the data from the native data format to another format;

transmitting, by the first device, the data to a cloud computing environment, in the other format;

converting, using a compute service, the data from the other format to a platform-independent data format associated with metadata defining one or more attributes for the data, wherein the conversion of the data is based on a function that corresponds to a container instance related to an ephemeral storage, and wherein the ephemeral storage is available for a duration of the function and is discarded after the duration of the function;

receiving, by the first device, a query that includes one or more search parameters matching the one or more attributes for the data; and providing, by the first device, the data associated with the one or more attributes matching the one or more search parameters.

16. The method of claim 15, wherein the compute service is utilized to add the metadata to a record associated with the platform-independent data format to improve search or retrieval function.

17. The method of claim 15, wherein the compute service is utilized to mask one or more data fields.

18. The method of claim 15, wherein the query is received from a second device, and wherein the data is provided to the second device and includes one or more data fields with sensitive data that is unmasked based on access rights.

19. The method of claim 15, further comprising:

storing an audit trail that includes information related to one or more interactions with the data within the cloud computing environment.

20. The method of claim 15, further comprising:

identifying access rights associated with a second device, wherein the query is received from the second device, and wherein the data is provided to the second device based on the access rights.

* * * * *